United States Patent

[11] 3,534,651

| [72] | Inventor | John G. Belfiglio<br>Havertown, Pennsylvania |
|---|---|---|
| [21] | Appl. No. | 813,495 |
| [22] | Filed | April 4, 1969 |
| [45] | Patented | Oct. 20, 1970 |
| [73] | Assignee | Standard Pressed Steel Co.<br>Jenkintown, Pennsylvania<br>a corporation of Pennsylvania |

[54] PRELOAD INDICATING NUT
9 Claims, 5 Drawing Figs.

[52] U.S. Cl. ................................................ 85/62,
151/21
[51] Int. Cl. ....................................................F16b 31/02,
F16b 39/28
[50] Field of Search........................................... 85/62, 61;
151/21(C), 21(A), 21(B); 10/86(A), 86

[56] References Cited
UNITED STATES PATENTS
2,546,332  3/1951  Costello ........................ 85/62

FOREIGN PATENTS
888,284  8/1943  France .................... 151/21(C)UX
188,267  11/1922  Great Britain.............. 151/21(C)UX

*Primary Examiner*—Ramon S. Britts
*Attorneys*—Stanley Belsky and Curtis, Morris and Safford ABSTRACT: A preload indicating nut wherein a peripheral exterior groove is cut into the body of the nut. When seating torque is applied to the nut, the groove collapses causing a nut height deflection which can be visually ascertained or measured. The degree of nut height deflection is indicative of a predetermined axial load. In one embodiment the groove is adapted to collapse completely causing an inward deformation to the internal thread surface of the nut thereby to provide a prevailing locking torque tending to act against displacement or loosening of the nut. In another embodiment the nut height deflection is controlled so that the groove does not collapse completely. A counterbore in the side of the nut adjacent the joint surface bends outwardly when the groove collapses to provide a flat bearing surface against the joint.

INVENTOR.
JOHN G. BELFIGLIO

BY

*Curtis, Morris & Safford*
ATTORNEYS

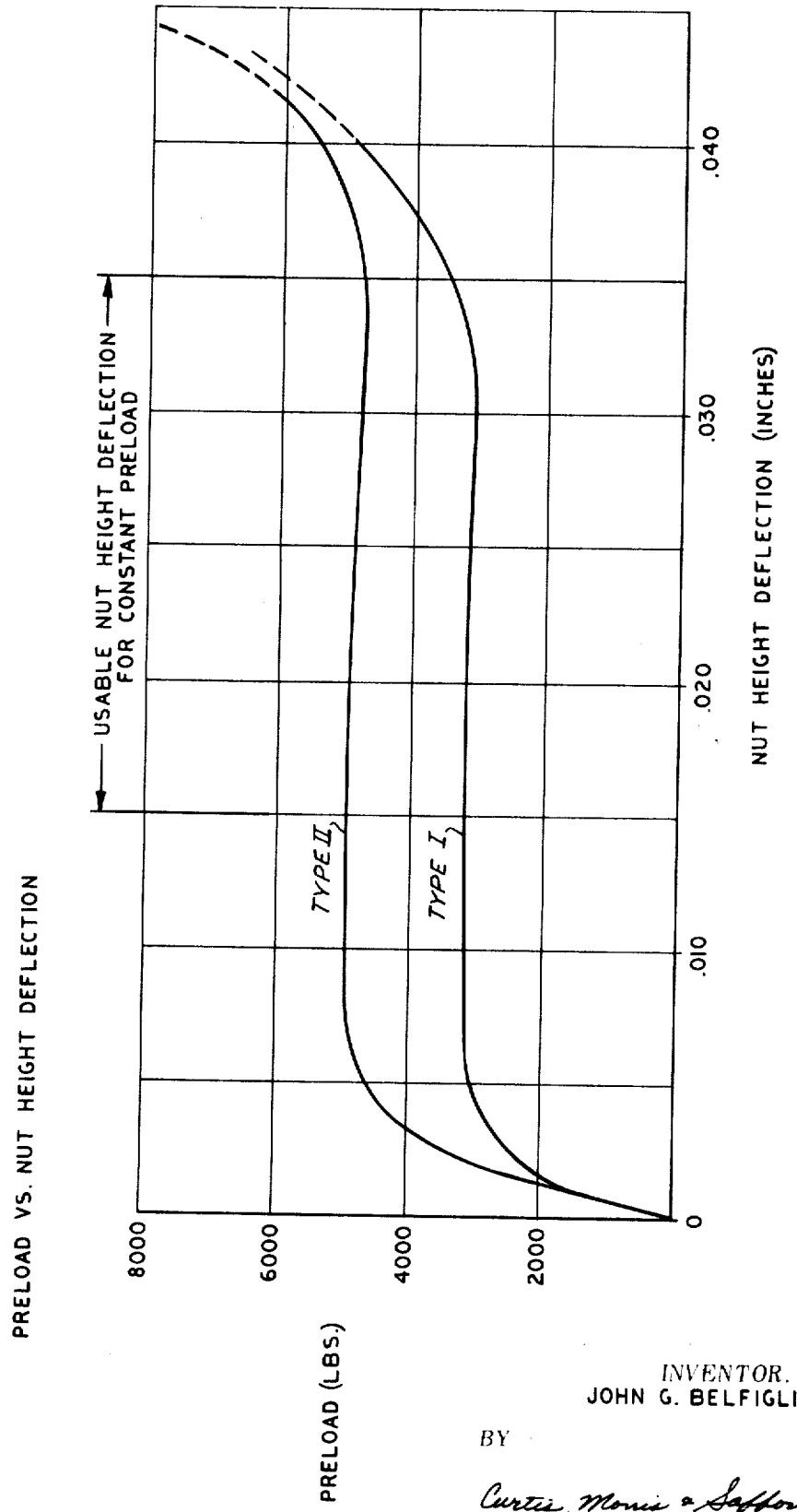

PRELOAD INDICATING NUT

This invention pertains to preload indicating nuts and more in particular to preload indicating nuts which provide a visual indication that a predetermined axial load has been applied. In one preferred embodiment of the present invention, a preload indicating nut is provided which also serves as a lock nut.

Lock nuts have been provided heretofore which have served the primary function of maintaining a prevailing torque between the nut and a coacting stud or bolt thereby to prevent unwanted or undesirable loosening of the nut. In addition, devices to indicate the axial load placed on a bolt have been provided which indicate in one fashion or another when a predetermined axial load has been applied to a threaded fastener joint.

Devices have also been provided which combine the two functions, i.e., locking function and load indicating function, but heretofore such combination devices have been unreliable, have not lent themselves to repeated use and in general have not been completely satisfactory for high quality commercial applications.

It is, therefore, among the objects of the present invention to provide a preload indicating nut which is initially free-spinning but which, when seated, is deformed to provide a self-locking action to preclude loosening of the nut.

A further object of this invention is to provide a preload indicating nut which, in the transitional phase from free-spinning to fully seated, provides visual indication of when the predetermined axial load is reached. Thus, the preload indicating nut of the present invention may be installed to a predetermined axial load without necessitating the use of an auxiliary tool such as a torque wrench.

A still further object of the present invention is to provide a preload indicating nut of the character described which has a commercially acceptable bearing surface configuration upon seating thereby to preclude undesirable deformation of the joint surface.

Yet another object of the present invention is to provide a preload indicating nut which can be reused through repeated cycles of use without material impairment of its self-locking function.

It is a still further object of the present invention to provide a preload indicating nut of the character described which can be manufactured at a relatively low cost in a commercially acceptable manner.

A still further object of the present invention is to provide a preload indicating nut which when installed will provide a consistently accurate preload to within plus or minus 10 percent of the desired preload.

These and other objects and advantages of the present invention will be in part obvious and in part pointed out below.

In a preferred embodiment of the present invention a standard hexagonal-shaped nut body having an internally threaded bore to coact with a threaded stud or bolt is provided with a peripheral groove cut into the nut's exterior surface and a counterbored end adjacent the joint surface. When torque is applied to the nut to seat the nut, this groove collapses causing a radially inward plastic deformation of the internal thread surface. This deformation causes an interference fit with the threaded bolt or stud and provides a self-locking function in the nut. Prior to the collapse of the groove the nut is completely free-spinning but once the bearing surface of the nut has seated, further rotation of the nut is impeded and a greater force is necessary to fully seat and lock the nut in place in order to apply the predetermined axial load to the joint. With the lock nut of the present invention, the groove is so dimensioned such that it collapses when the predetermined axial load has been reached. With the collapse of the groove the counterbored end is bent outwardly such that when the nut is fully seated, the nut presents a flat bearing surface against the joint. Hence, use of a supplementary tool or load indicating device is obviated as the predetermined axial load is reached when the groove collapses and this groove collapse is visually apparent to the operator.

In the drawing:

FIG. 5 is a graphical representation showing the relationship between groove collapse and imparted axial load.

Figure 1:
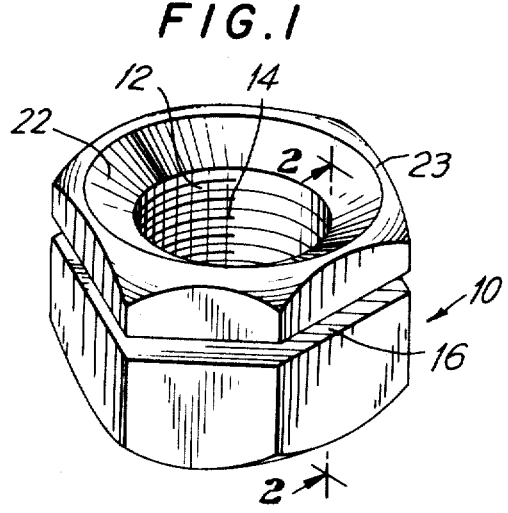
FIG. 1 is a perspective view of a lock nut prepared in accordance with the present invention.
Figure 2:
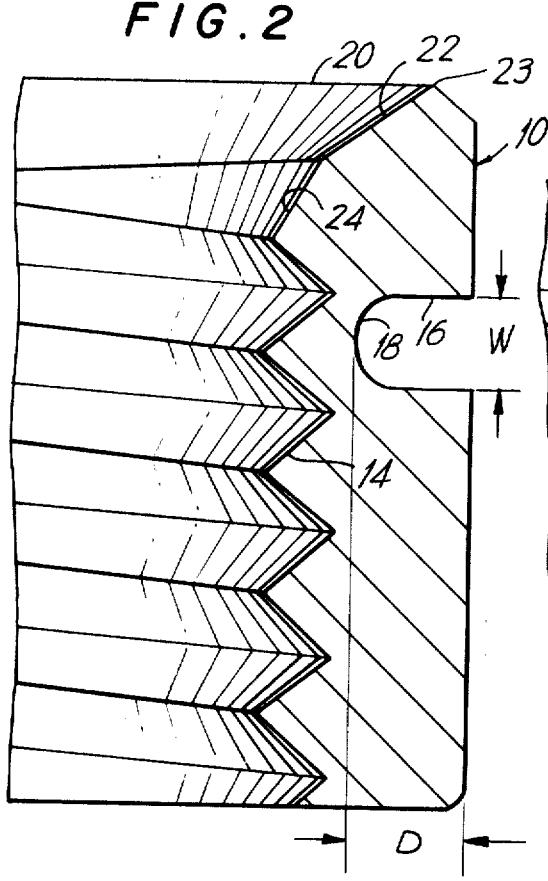
FIG. 2 is a vertical sectional view taken on line 2-2 of FIG. 1.

With reference to FIGS. 1 and 2, there is shown a nut 10 which preferably has a hexagonal-shaped periphery and an internal stud receiving bore 12 therethrough threaded, as at 14, in a conventional manner so as to threadedly engage a stud or bolt (not shown). The nut is provided with a peripheral groove 16 which is cut into the exterior surface of the nut. The groove 16 terminates in a rounded portion 18, although a V-shape or square shape may also be employed, and has a depth D and width W which are selected so that when the nut 10 is engaged on a stud and tightened by applying a tightening torque, the groove 16 collapses to indicate that a predetermined axial load has been applied, as will be explained more fully hereinbelow.

As viewed in FIG. 2, the uppermost end 20 of the nut is the end which bears against the surface to be locked, i.e., a washer or plate member, and thus, the end 20 of the nut is prepared to provide a bearing surface for the seated nut after the groove 16 has collapsed. Accordingly, frusto-conical bearing surface 22 is provided in the end 20, for example by counterboring end 20. The angle of inclination of the frusto-conical surface 22 with respect to the longitudinal axis of the nut is in the range of 50° to 75° and preferably 60°.

The juncture 23 of the frusto-conical surface 22 and the bearing end is located radially outwardly of the terminal portion 18 of the groove 16. Thus, when the nut is tightened, the compressive force imposed on the bearing end 20 of the nut is converted to a bending moment which bends the frusto-conical surface outwardly to a substantially flat joint abutting bearing surface.

In addition to the first frusto-conical surface 22, it has been found, where high preloads are used, that an additional frusto-conical surface 24 should be provided at the bottom of surface 22 as an extension thereof. Frusto-conical surface 24 has an angle of inclination with respect to the longitudinal axis of the nut which is less than the angle of inclination of surface 22 and in the range of 20° to 40° and preferably 30°. The additional surface 24 is necessary to preclude cracking of the lead thread of the internally threaded surface 14 when the nut is used to apply high axial loads. Thus, as the groove collapses and the bearing end of the nut deforms as a result of the bending moment tending to bend surface 22, the second surface 24 provides a transitional stage which relieves high stress concentrations and prevents cracking in the lead thread.

Figure 3:
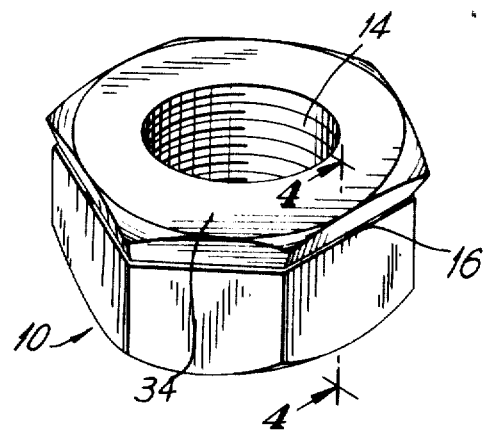
FIG. 3 is a view similar to FIG. 1 showing the nut after the groove has been collapsed.
Figure 4:
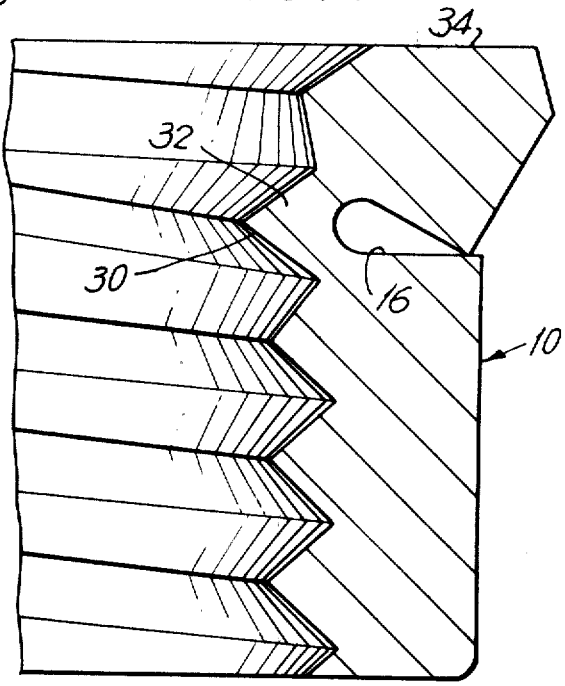
FIG. 4 is a view similar to FIG. 2 taken on line 4-4 of FIG. 3.

In use, a nut prepared as shown in FIGS. 1 and 2 is threadedly engaged on a coacting bolt or stud with the end 20 positioned so that it faces the joint surface. Until contact with the joint surface is made, the nut 10 is free-spinning and this free-spinning rotation is impeded only when the end 20 comes into contact with the joint surface. At this juncture, an increased applied torque is necessary to cause further rotation of the nut. As the nut is rotated further, a compressive force is imparted to the nut and the groove 16 collapses due to the bending moment imparted to the bearing end which results in a foreshortening of the overall length of the nut or nut height deflection. The collapse of groove 16 also causes the threaded area 30 (see FIG. 4) adjacent the groove 16 to deform radially inwardly. This inward deformation of the threaded surface 30 in this area is due to bending of the portion of the nut body 32 between the end of the groove 18 and the internal bore diameter of the nut. The bending is also transmitted to the surface 22 causing surface 22 to fold outwardly to form a flat bearing surface 34 (see FIG. 3) which abuts the joint surface. This flat surface 34 provides a positive bearing surface which increases the frictional bearing surface engaged with the joint and, hence, the locking ability of the nut. The flat surface 34 also prevents "Brinnelling" of the contiguous joint surface. As pointed out above, the depth D and width W of the groove are initially selected such that complete collapse of the groove is accomplished when a predetermined axial load has been applied. Thus, collapse of groove 16 provides a visual indication of when the predetermined axial load has been applied.

The deformation of the groove 16 is a plastic deformation and hence, after removal of the application load the nut remains fixed in position and is locked on the stud due to the radially inward deformation of the threaded surface in the area of the collapsed groove 16. The nut may be removed and can be reapplied through repeated applications and still retain the locking characteristics due to the deformation of the internal thread surface. When the nut is reapplied, however, a torque indicating tool is preferably used if it is desired to reseat the nut to the prescribed preload using applied torque as the measurement.

The placement of the groove 16 relative to the end 20 as well as the depth D and width W of the groove are all factors which are taken into consideration in order to have the groove 16 collapse at a predetermined axial load. The degree of bending which area 32 will undergo, depending upon the factors of depth and width of the groove and placement of the groove, will also determine the angle of inclination of surface 22. As an illustration, a 3/8-16 UNC hexagonal nut prepared according to the present invention to have a 4950 pound axial load when the groove 16 collapses has dimensions as follows:

Overall Length .395 to .405 inches
Groove Width .053 to .058 inches
Diameter to Base of Groove .425 to .435 inches
Angle of Inclination of Bearing Surface 60°
Centerline of Groove from Bearing Surface End .137 to .144 inches The 3/8-16 nut prepared as above will, when seated until groove 16 collapses, provide a 4950 pound axial preload, which incidentally occurs at approximately 300 in-lbs. seating torque, and subsequently will have a prevailing locking torque of the order of 35 to 55 in-lbs. due to the inward deformation of the thread surface in the area adjacent the collapsed groove. Hence, in order to loosen the nut from its installed position it will be necessary to apply an unseating or breakloose torque of about 250 in-lbs. and then a torque of 35 to 55 in-lbs. to disengage the nut from its associated stud member.

One major benefit of the nut is that in high speed production line applications, the nut may be applied rapidly to a predetermined axial load without the use of torque indicating tools such as a torque wrench. When torque wrenches are used the operator must pay careful and close attention in order to apply the predetermined axial load. Thus, where cost is a factor, use of a torque wrench adds a significant direct labor cost as a result of the careful attention required of the operator. Where no close attention is required of the operator, as with the present invention, the operator need only apply tightening torque until the groove's collapse is ascertained. Hence, greater speed in installation results which is a significant cost factor in high volume operations.

With reference now to FIG. 5, there is shown a graph which plots axial preload against the nut height deflection, i.e., degree of foreshortening due to groove collapse for a 3/8-16 UNC hexagonal nut prepared according to the present invention and dimensioned as follows:

Overall Length .395 to .405 inches
Groove Width .058 inches
Diameter to Base of Groove .450 inches
Angle of Inclination of Bearing Surface 70°
Centerline of Groove from Bearing Surface End .177 inches The 3/8-16 nut prepared as above, differs slightly from the nut previously described. The prior described nut is designed so that the predetermined axial preload of 4950 pounds is reached when the groove collapses completely.

It has been found, when preload is plotted as a function of the nut height deflection that a relationship exists between preload and nut height deflection as shown by the curve shown in FIG. 5. There is a linear portion of the curve wherein preload remains constant for a significant change in nut height deflection. This essentially linear condition occurs prior to the complete collapse of the groove. Hence, by tightening the nut so that the groove collapses to point within this range and in the constant linear preload range a more exact measure of the applied preload can be obtained with a larger margin of permittable error in nut height deflection. Thus, for the nut prepared as above, to achieve a 4950 pound axial preload, it is seen that a nut height deflection of from .015 inches to .035 inches will result in a 4950 pound axial preload. Thus, where the precise axial preload is critical, a nut dimensioned to result in the predetermined axial preload prior to complete groove collapse is employed as there is a wider range of nut height deflection which can be utilized. Therefore, a tool may be employed to tighten the nut until the nut height deflection changes to the desired degree of foreshortening. In this way a high degree of accuracy is attained in applying the desired preload to the joint. In fact, consistent accuracy to within plus or minus 10 percent of the desired preload is attainable.

A plot of preload against nut height deflection for both embodiments described herein is shown in FIG. 5. The lower curve corresponds to the 3/8-16 UNC nut dimensioned as noted in the description of the first embodiment and is designated type I, while the curve for the second embodiment 3/8-16 UNC nut is designated type II. Both nuts were designed to provide an axial preload of 4950 pounds. The type I nuts were designed to provide the predetermined axial preload at complete groove collapse and, since the complete collapse of the groove results in an internal thread deformation, the type I nuts also provide a self-locking action. As noted in FIG. 5 for the type I nuts, the predetermined axial preload is reached at a steep portion of the curve. Hence, slight changes in the degree of nut height deflection will affect the axial preload applied by the nut much more significantly although accurate control can be maintained for uniform predictability of preload applied. It is to be noted that the type I nuts may be used in the manner of the type II nuts for a lower value of axial preload so that depending upon the design perimeters required, the nuts may be dimensioned to provide a predetermined preload only and/or a predetermined preload with a self-locking action.

One area of application for the preload indicating nut of the present invention is in the automotive industry where initially the nut is installed to a predetermined axial load in assembly line operations. Once the automobile is in the field and the nut removed, for example to enable maintenance work to be done, the nut can be reinstalled with a torque wrench to the prescribed preload using torque as the measurement as speed here is not a critical factor and the nut still retains high reuse capabilities.

Hence, it is seen that the present invention provides a preload indicating nut which can be installed readily in assembly line operations to a predetermined axial load and which may also act as a lock nut after installation. Additionally, the nut can be reused for repeated cycles while still maintaining its function.

I claim:

1. A preload indicating nut comprising:
    a nut member having a standard threaded longitudinal bore therein to matingly receive an externally threaded stud member,
    said nut member having an exterior peripheral groove in a plane substantially normal to the axis of said bore,
    said groove being dimensioned as to width and depth such that upon application of a tightening torque to seal said nut member against a joint surface said groove collapses when a predetermined axial load is reached,
    said nut member having a bearing end including an annular bearing edge adapted to be placed adjacent said joint surface and a first, continuous initially frusto-conical surface extending radially inwardly from said bearing edge toward said bore, the juncture of said first frusto-conical surface and said bearing end being located radially outwardly of the bottom of said groove, and a second, continuous frusto-conical surface radially and axially inwardly of said first frusto-conical surface and joined thereto and having an angle of inclination with respect to the longitudinal axis of said nut member which is less than the angle of inclination of both said first frusto-conical surface and the flanks of the nut threads whereby the compressive force imposed on said sealing surface by seating of said nut member will be converted to a torque bending to collapse said groove and bend said first frusto-conical surface outwardly to form a flat bearing surface against said joint surface.

2. A preload indicating nut as defined in claim 1 wherein the internal thread surface of said nut member in the area adjacent said groove is plastically deformed as said groove collapses from a standard threaded condition to one wherein the thread surface in said area is radially inwardly deformed thereby to provide an interference fit with the external thread surface of a coacting stud member to provide a self-locking action thereto.

3. A preload indicating nut as defined in claim 1 wherein the angle of inclination of said first frusto-conical surface with respect to the longitudinal axis of said nut member is in the range of 50° to 75°.

4. A preload indicating nut as defined in claim 3 wherein said angle of inclination is 60°.

5. A preload indicating nut as defined in claim 3 wherein the angle of inclination of said second frusto-conical surface with respect to the longitudinal axis of said nut member is in the range of 20° to 40°.

6. A preload indicating nut comprising:
an internally threaded nut member,
said nut member including a collapsible exterior peripheral groove positioned along the longitudinal length of said nut member,
one end of said nut including an annular joint bearing edge therein,
said nut member being adapted to matingly engage a threaded stud member and to be freely rotatable with respect to said stud member until said joint bearing edge abuts a joint surface,
said nut member being adapted to be further rotated with respect to said stud member upon application of a progressively increasing seating torque until a predetermined axial load is reached whereby said groove collapses causing a foreshortening of said nut member due to a plastic deformation in the nut member in an area adjacent said groove,
said one end of said nut having a first, continuous initially frusto-conical surface extending radially inwardly from said bearing edge toward the internal threads which bends from said frusto-conical position to a substantially flat bearing presenting a substantially coplanar surface to abut a joint surface when said groove is collapsed, and
a second frusto-conical surface joined to said first frusto-conical surface and positioned radially and axially inwardly thereof and having an angle of inclination with respect to the longitudinal axis of said nut member which is less than the angle of inclination of both said first frusto-conical surface and the flanks of the nut threads.

7. A preload indicating nut as defined in claim 6 wherein said first frusto-conical surface has an initial angle of inclination with respect to the longitudinal axis of the nut in the range of 50° to 75° and said second frusto-conical surface has an angle of inclination in the range of 20° to 40°.

8. A preload indicating nut as defined in claim 7 wherein said first angle of inclination is 60° and said second angle of inclination is 30°.

9. A preload indicating nut as defined in claim 6 wherein said plastic deformation in said area adjacent said groove is sufficient to radially inwardly deform a portion of the nut internal thread surface to cause an interference fit with said stud member to effectively lock said nut to said stud member.